United States Patent [19]

Sumi et al.

[11] Patent Number: 5,029,154
[45] Date of Patent: Jul. 2, 1991

[54] OPTICAL REPRODUCING APPARATUS

[75] Inventors: Yuji Sumi, Yokohama; Hideo Maeda, Tokyo, both of Japan

[73] Assignee: Ricoh Company, Ltd., Tokyo, Japan

[21] Appl. No.: 439,797

[22] Filed: Nov. 21, 1989

[30] Foreign Application Priority Data

Nov. 21, 1988 [JP] Japan ................................. 63-294337
Nov. 28, 1988 [JP] Japan ................................. 63-300396
Sep. 21, 1989 [JP] Japan ................................. 1-246114

[51] Int. Cl.$^5$ .............................................. G11B 7/00
[52] U.S. Cl. ................................. 369/112; 369/44.12; 369/109; 369/103; 350/162.2; 250/201.5
[58] Field of Search ............... 369/44.11, 44.12, 44.23, 369/44.41, 44.42, 112, 109, 103; 350/162.2, 162.11, 162.12, 162.13, 162.14, 162.15–162.24, 167; 356/356; 250/201.5, 201.1

[56] References Cited

U.S. PATENT DOCUMENTS

| | | | |
|---|---|---|---|
| 4,729,640 | 3/1988 | Sakata | 350/162.21 |
| 4,894,815 | 1/1990 | Yamanaka | 369/112 |
| 4,918,679 | 4/1990 | Opheij et al. | 369/112 |

FOREIGN PATENT DOCUMENTS

| | | | |
|---|---|---|---|
| 0195657 | 9/1986 | European Pat. Off. | 369/103 |
| 0253442 | 7/1987 | European Pat. Off. | |
| 0293223 | 12/1982 | Japan | 350/162.17 |
| 7500316 | 1/1975 | Netherlands | 350/162.17 |

Primary Examiner—Roy N. Envall, Jr.
Assistant Examiner—Thang V. Tran
Attorney, Agent, or Firm—Cooper & Dunham

[57] ABSTRACT

An optical reproducing apparatus has a dual grating provided with a substrate, a first diffraction grating and a second diffraction grating. The first grating receives an incident light reflected from an optical recording medium and separates the reflected light into a first transmitted light and a first diffracted light. The second grating receives the first transmitted light and the first diffracted light through the substrate and discharges a second diffracted light and a second transmitted light. A tracking error signal detector detects a tracking error signal by receiving one of the second transmitted light and the second diffracted light. A focusing error signal detector detects a focusing error signal be receiving the other of the second transmitted light and the second diffracted light.

21 Claims, 7 Drawing Sheets

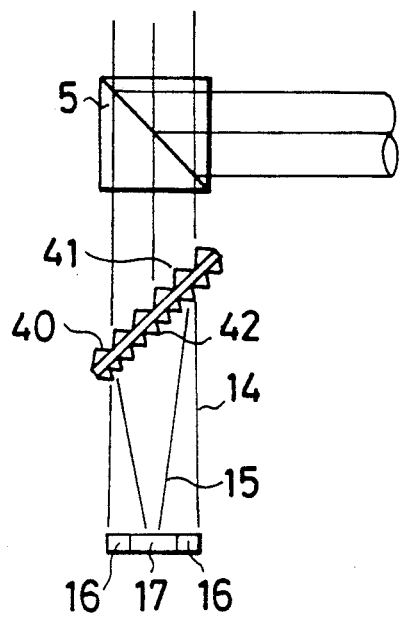
Fig. 14
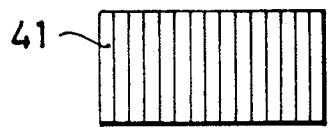
Fig. 15(a)
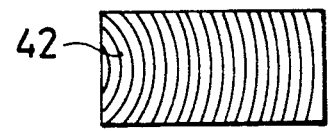
Fig. 15(b)
Fig. 16
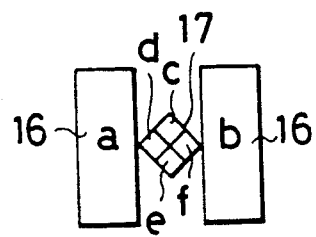
Fig. 17
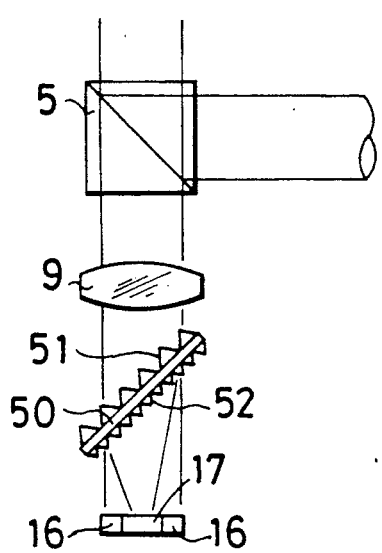

ns/5,029,154

OPTICAL REPRODUCING APPARATUS

BACKGROUND OF THE INVENTION

The present invention relates to an optical reproducing apparatus which is arranged to optically utilize the direction of polarization of light reflected from an optical recording medium such as a photo-electromagnetic disk to optically reproduce information recorded on the optical recording medium or to optically record information on the same.

In general, in order to reduce the access time of an optical disk apparatus of this type, it is important to reduce the size and the weight of the entire optical system of an optical pickup. However, in conventional arrangements of the type in which a track signal, a focus signal and a photo-electromagnetic signal are detected by individual optical systems, a large number of optical parts, and hence a complicated structure, are required. As a result, the weight of the optical pickup increases and the access time inevitably becomes long. In such a situation, an attempt has been made at reducing the size and the weight of the optical pickup by utilizing a high-density grating as a part of the optical pickup. In this system, however, because of the high-density grating, the diffraction angle of diffracted light tends to deviate to a great extent due to fluctuations in the wavelength of the laser light fed from a semiconductor laser. Moreover, two photosensor elements, one for detecting a focus signal and the other for detecting a track signal, are spaced apart from each other by a great distance, thus leading to difficulty in assembly or adjustment.

In light of the above problems, in U.S. patent application Ser. No. 294,466 filed on Jan. 6, 1989, the present applicant proposes an optical pickup which employs a dual grating as the light separating means to realize a light-signal detecting function in the form of a compound integral arrangement. In this optical pickup, it is possible to greatly reduce changes in a diffraction angle due to wavelength fluctuations in a light source, since two gratings of the dual grating serve to cancel such wavelength fluctuations with each other by means of its dual structure. In this optical pickup, the light reflected from an optical disk passes through an objective lens and a polarizing beam splitter, being incident on a focusing lens, and then on the dual grating. This dual grating is of a light-transmitting type in which a first grating and a second grating are formed on opposite surfaces of one substrate integrally therewith, and the first grating arranged as a high-density grating is located on a side nearer to the focusing lens, while the second grating arranged as a modulation pitch grating is located on the outgoing side, from which the light exits. The dual grating is disposed in such a manner as to be inclined by a predetermined angle with respect to the optical axis of the light reflected from the optical disk.

In such a construction and arrangement, the light focused on the dual grating by the focusing lens is separated into a diffracted light and a transmitted light. A focus signal is detected by an astigmatism method utilizing a four-split type photosensor element for receiving the transmitted light, while a track signal is detected by a push-pull method utilizing a two-split type photosensor element for receiving the diffracted light. In addition, a particular photo-electromagnetic signal on the optical disk is picked up by obtaining the difference between the detection outputs of the respective photosensor elements.

In accordance with the above-mentioned system employing the dual grating, even if wavelength fluctuations occur in the laser light emitted from the semiconductor laser, the diffracted light exiting from the dual grating suffers little offset and is therefore insusceptible to the influence of the wavelength fluctuations because the first grating and the second grating serve to cancel the wavelength fluctuations with each other. In addition, it is possible to provide an optical pickup consisting of a small number of parts and having a relatively small size.

The above-mentioned system employing the dual grating, however, has the following problems.

The first problem is that, even if the pitch of diffraction pattern on the first grating is made equal to the pitch of a diffraction pattern on the second grating so that fluctuations in the angle of diffraction will become small, the fluctuations still exist in some degree because it will occur while the diffracted light from the first grating is traveling in the dual grating to the second grating. Accordingly, the influence of the wavelength fluctuations can not be effectively eliminated.

The second problem is that a great limitation is imposed on any reduction in the overall size of the optical system of the optical pickup. If the optical pickup of this system is to be further miniaturized, it is necessary to employ a focusing lens having a small focal length f, but, since the interval between the photosensor element for detecting a track signal and the photosensor element for detecting a focus signal is definite, the angle of separation between the transmitted light and the diffracted light in the dual grating inevitably becomes large and the resistance of the dual grating to wavelength fluctuations deteriorates. As a result, the performance of the entire optical pickup is impaired. It follows, therefore, that a reduction in the overall size of the optical system of the optical pickup is limited to a great extent.

SUMMARY OF THE INVENTION

It is an object of the present invention to provide an optical reproducing apparatus in which the overall size of the optical system of the optical pickup can be miniaturized while the influence of wavelength fluctuations is effectively reduced.

According to the present invention, the above-mentioned object can be achieved by an optical reproducing apparatus, comprising:

a dual grating provided with a substrate, a first diffraction grating on one surface of the substrate and a second diffraction grating on the other surface of the substrate, the first grating receiving an incident light reflected from an optical recording medium and separating the incident light into a first transmitted light and a first diffracted light, the second grating receiving the first transmitted light and the first diffracted light through the substrate and discharging a second transmitted light and a second diffracted light;

a detector for detecting a tracking error signal by receiving one of the second transmitted light and the second diffracted light; and a detector for detecting a focusing error signal by receiving the other of the second transmitted light and the second diffracted light, wherein the tracking error signal detector and the focusing error signal detector are disposed approximately in a same plane, pitch distributions of the first grating and the second grating being prescribed by the following inequalities (1) and (2):

$$20 \ \mu m \geq \Delta x \Delta \lambda \qquad (1)$$

$$20 \ \mu m \geq \Delta y \Delta \lambda \qquad (2)$$

where $$\Delta x = t \times \left[ \frac{1}{dx} \left\{ 1 - \left( m_0 - \frac{\lambda}{dy} \right)^2 \right\} + \right.$$

$$\frac{1}{dy} \left( l_0 - \frac{\lambda}{dx} \right) \left( m_0 - \frac{\lambda}{dy} \right) \right] /$$

$$\left\{ 1 - \left( l_0 - \frac{\lambda}{dx} \right)^2 - \left( m_0 - \frac{\lambda}{dy} \right)^2 \right\}^{\frac{3}{2}} + T \times$$

$$\left[ \left[ \left( \frac{1}{dx} - \frac{1}{dx'} \right) \left[ 1 - \left( m_0 - \lambda \left( \frac{1}{dy} - \frac{1}{dy'} \right) \right)^2 \right] + \right. \right.$$

$$\left( \frac{1}{dy} - \frac{1}{dy'} \right) \left( l_0 - \lambda \left( \frac{1}{dx} - \frac{1}{dx'} \right) \right)$$

$$\left. \left( m_0 - \lambda \left( \frac{1}{dy} - \frac{1}{dy'} \right) \right) \right] \right] /$$

$$\left[ 1 - \left( l_0 - \lambda \left( \frac{1}{dx} - \frac{1}{dx'} \right) \right)^2 - \right.$$

$$\left. \left( m_0 - \lambda \left( \frac{1}{dy} - \frac{1}{dy'} \right) \right)^2 \right]^{\frac{3}{2}} \qquad (3)$$

$$\Delta y = t \times \left[ \frac{1}{dy} \left\{ 1 - \left( l_0 - \frac{\lambda}{dx} \right)^2 \right\} + \right.$$

$$\frac{1}{dx} \left( l_0 - \frac{\lambda}{dx} \right) \left( m_0 - \frac{\lambda}{dy} \right) \right] /$$

$$\left\{ 1 - \left( l_0 - \frac{\lambda}{dx} \right)^2 - \left( m_0 - \frac{\lambda}{dy} \right)^2 \right\}^{\frac{3}{2}} + T \times$$

$$\left[ \left[ \left( \frac{1}{dy} - \frac{1}{dy'} \right) \left[ 1 - \left( l_0 - \lambda \left( \frac{1}{dx} - \frac{1}{dx'} \right) \right)^2 \right] + \right. \right.$$

$$\left( \frac{1}{dx} - \frac{1}{dx'} \right) \left( l_0 - \lambda \left( \frac{1}{dx} - \frac{1}{dx'} \right) \right)$$

$$\left. \left( m_0 - \lambda \left( \frac{1}{dy} - \frac{1}{dy'} \right) \right) \right] \right] /$$

$$\left[ 1 - \left( l_0 - \lambda \left( \frac{1}{dx} - \frac{1}{dx'} \right) \right)^2 - \right.$$

$$\left. \left( m_0 - \lambda \left( \frac{1}{dy} - \frac{1}{dy'} \right) \right)^2 \right]^{\frac{3}{2}} \qquad (4)$$

where
  $dx$: x-direction pitch of the first grating,
  $dy$: y-direction pitch of the first grating,
  $dx'$: x-direction pitch of the second grating,
  $dy'$: y-direction pitch of the second grating,
  $t$: distance between the first grating and the second grating,
  $l_0$: x-direction vector of the incident light,
  $m_0$: y-direction vector of the incident light,
  $n_0$: z-direction vector of the incident light,
  $\lambda$: wavelength of the incident light,
  $\Delta\lambda$: amount of wavelength fluctuation,
  $T$: z-direction distance between the second grating and the plane on which the detectors are disposed, and
  $20 \ \mu m$: allowable wavelength fluctuation limit of a light spot on the plane on which the detectors are disposed.

According to the optical reproducing apparatus of the present invention, a dual grating is provided with a first diffraction grating and a second diffraction grating. The first grating receives an incident light and separates the incident light into a first transmitted light and a first diffracted light. Then the second grating receives the first transmitted light and the first diffracted light and discharges a second transmitted light and a second diffracted light. The tracking error signal detecting means detects one of the second transmitted light and the second diffracted light. The focusing error signal detecting means detects the other of the second transmitted light and the second diffracted light. Wherein, since the tracking error signal detecting means and the focusing error signal detecting means are disposed approximately in a same plane and the pitch distributions of the first grating and the second grating are prescribed by the inequalities (1) and (2), it is possible to improve the resistance of the dual grating against the wavelength fluctuations while reducing the angle of separation between the second transmitted light and the second diffracted light. Accordingly, it is possible to reduce the entire size of the optical system of the optical pickup without impairing the performance of the optical pickup.

Further objects and advantages of the present invention will be apparent from the following description of the preferred embodiments of the present invention as illustrated in the accompanying drawings.

BRIEF DESCRIPTION OF THE DRAWINGS

FIG. 14 is a schematic partial front view of a fourth embodiment of the present invention;

FIG. 15(a) is a schematic plan view showing the configuration of the first grating of FIG. 14;

FIG. 15(b) is a schematic plan view showing the configuration of the second grating of FIG. 14;

FIG. 16 is a schematic plan view showing the arrangement of the photosensor elements of FIG. 14;

FIG. 17 is a schematic partial front view showing a fifth embodiment of the present invention;

DETAILED DESCRIPTION OF THE PREFERRED EMBODIMENTS

Figure 1:
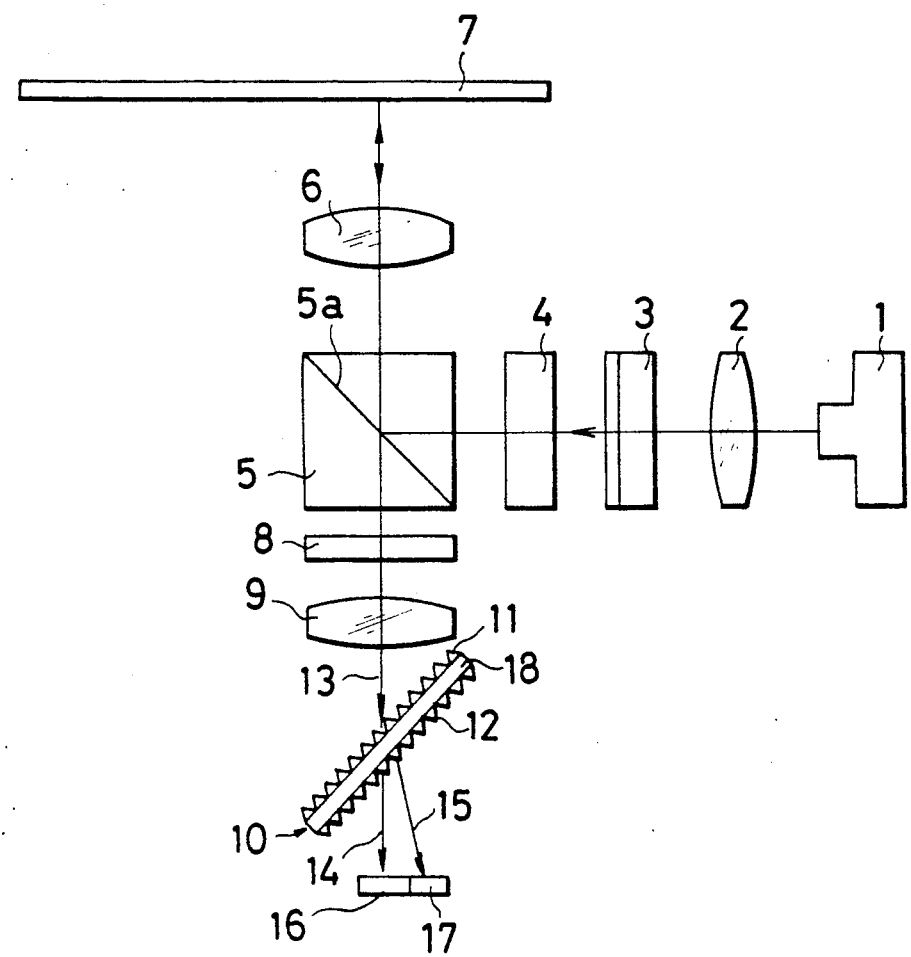
FIG. 1 is a schematic front view showing the overall construction of a first embodiment of the present invention.

FIG. 1 is a schematic diagram showing the overall construction of a first embodiment of an optical reproducing apparatus according to the present invention. Laser light, emitted from a semiconductor laser 1, is transmitted through a coupling lens 2 and beam shaping prisms 3 and 4, then polarized at a polarizing surface 5a of a polarizing beam splitter 5, and then focused onto a photo-electromagnetic disk 7 through an objective lens 6. Light reflected from the photo-electromagnetic disk 7 again passes through the objective lens 6 and the polarizing beam splitter 5, and it is separated from the incident light by the polarizing beam splitter 5. The light exiting from the polarizing beam splitter 5 is incident on a ½ wavelength plate 8, which causes the direction of polarization of the light to rotate by an angle of 45 degrees. This light is then incident on a focusing lens 9 and, then, on a dual grating 10. This dual grating 10 is of the light-transmitting type, which has a first grating 11 and a second grating 12 integrally formed on the opposite surfaces of a common substrate 18, respectively, the first grating 11 being located on the side facing the focusing lens 9 (on the incident side) with a second grating 12 located on the outgoing side. The dual grating 10 is disposed on the optical axis of reflected light 13 conducted from the photo-electromagnetic disk 7, i.e., on the optical axis of the objective lens 6 in such a manner that the longitudinal axis of the dual grating 10 is inclined by a predetermined angle with respect to that optical axis. The outgoing side of this dual grating 10 is provided with a two-split type photosensor element 16, which serves as a track-signal detecting photosensor for receiving a second transmitted light 14, and a four-split type photosensor element 17, which serves as a focus-signal detecting photosensor for receiving a second diffracted light 15.

In the above arrangement and construction, light focused by the focusing lens 9 and input to the dual grating 10 is split into transmitted light 14 and diffracted light 15. The transmitted light 14 is subjected to a track detecting process by the two-split type photosensor element 16 utilizing a push-pull method. The diffracted light 15, which is diffracted in one direction in accordance with the modulation pitch of the grating 12, is subjected to a focus detecting process by the four-split type photosensor element 17 utilizing a astigmatism method. Photo-electromagnetic signals, recorded on the photo-electromagnetic disk 7, are picked up by obtaining the difference between the detection outputs from the respective photosensor elements 16 and 17.

The dual grating 10 used in the first embodiment is explained in detail below with reference to FIGS. 2 to 6.

Figure 2:
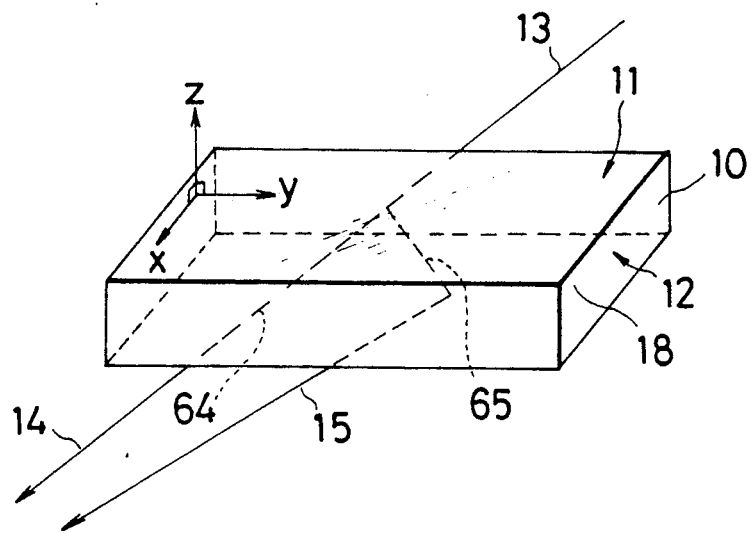
FIG. 2 is a diagrammatic perspective view illustrating a dual grating according to the first embodiment of the present invention.

The dual grating 10 shown in FIG. 2 includes the transparent substrate 18 and the light-transmitting type first and second gratings 11 and 12 which are disposed on respective opposite surfaces of the substrate 18, wherein the grating planes of the first and second gratings 11 and 12 are arranged in parallel.

Figure 3:
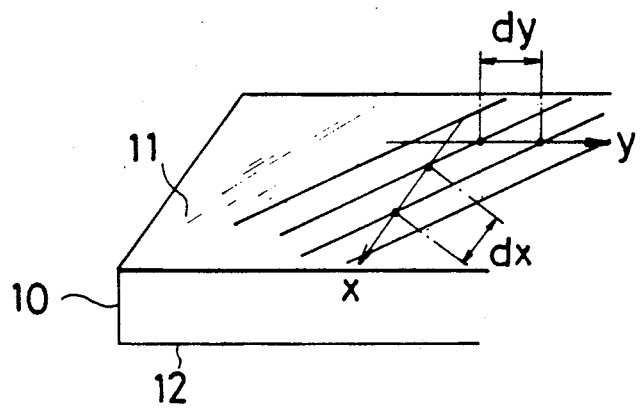
FIG. 3 is a diagrammatic partial perspective view illustrating the dual grating according to the first embodiment of the present invention.

As shown in FIG. 3, if dx and dy represent the x-direction grating pitch and the y-direction grating pitch on the incident side, respectively; dx' and dy' represent the x-direction grating pitch and the y-direction grating pitch on the outgoing side, respectively; $(l_0, m_0, n_0)$ represents the direction vector of the reflected light 13 which is incident on the dual grating 10; $(l_1, m_1, n_1)$ represents the direction vector of first diffracted light 65 diffracted by the first grating 11 located; and λ represents the wavelength of the diffracted light 65, the following equations (5) to (7) are obtained:

$$l_1 = l_0 \pm \lambda/dx \quad (5)$$

$$m_1 = m_0 \pm \lambda/dy \quad (6)$$

$$n_1 = -\sqrt{1 - l_0^2 - m_1^2} \quad (7)$$

If $(l_2, m_2, n_2)$ represents the direction vector of the diffracted light 15 diffracted by the second grating 12; the following equations (8) to (10) are obtained:

$$l_2 = l_1 \mp \lambda/dx' \quad (8)$$

$$m_2 = m_1 \mp \lambda/dy' \quad (9)$$

$$n_2 = -\sqrt{1 - l_2^2 - m_1^2} \quad (10)$$

The x and y coordinates, at a position where the z-coordinate of the diffracted light 15 is −T (T>0), are represented as follows:

$$x = \frac{l_1}{n_1} t + \frac{l_2}{n_2} T \quad (11)$$

$$y = \frac{m_1}{n_1} t + \frac{m_2}{n_2} T \quad (12)$$

If $l_0 > 0$ and $m_0 > 0$, then $l_1 = l_0 - \lambda/dx$, $m_1 = m_0 - \lambda/dx$, $l_2 = l_1 + \lambda/dx'$ and $m_2 = m_1 + \lambda/dy'$. At this time, variations in the x and y directions during fluctuations in wavelength are represented by $\Delta x$ and $\Delta y$:

$$\Delta x = \frac{d}{d\lambda}\left(\frac{l_1}{n_1}\right) t + \frac{d}{d\lambda}\left(\frac{l_2}{n_2}\right) T \quad (13)$$

$$\Delta y = \frac{d}{d\lambda}\left(\frac{m_1}{n_1}\right) t + \frac{d}{d\lambda}\left(\frac{m_2}{n_2}\right) T \quad (14)$$

$\Delta x$ and $\Delta y$ are obtained as following by calculations using Equations 5 to 14, $$\Delta x = t \times \left[ \frac{1}{dx}\left\{ 1 - \left(m_0 - \frac{\lambda}{dy}\right)^2 \right\} + \right. \quad (3)$$

$$\frac{1}{dy}\left(l_0 - \frac{\lambda}{dx}\right)\left(m_0 - \frac{\lambda}{dy}\right) \Bigg] /$$

$$\left\{ 1 - \left(l_0 - \frac{\lambda}{dx}\right)^2 - \left(m_0 - \frac{\lambda}{dy}\right)^2 \right\}^{\frac{3}{2}} + T \times$$

$$\left[ \left[ \left(\frac{1}{dx} - \frac{1}{dx'}\right)\left[ 1 - \left\{m_0 - \lambda\left(\frac{1}{dy} - \frac{1}{dy'}\right)\right\}^2 \right] + \right.\right.$$

$$\left(\frac{1}{dy} - \frac{1}{dy'}\right)\left(l_0 - \lambda\left(\frac{1}{dx} - \frac{1}{dx'}\right)\right)$$

$$\left. \left\{m_0 - \lambda\left(\frac{1}{dy} - \frac{1}{dy'}\right)\right\} \right] \Bigg] /$$

$$\left[ 1 - \left\{l_0 - \lambda\left(\frac{1}{dx} - \frac{1}{dx'}\right)\right\}^2 - \right.$$

$$\left. \left\{m_0 - \lambda\left(\frac{1}{dy} - \frac{1}{dy'}\right)\right\}^2 \right]^{\frac{3}{2}}$$

$$\Delta y = t \times \left[ \frac{1}{dy}\left\{ 1 - \left(l_0 - \frac{\lambda}{dx}\right)^2 \right\} + \right. \quad (4)$$

$$\frac{1}{dx}\left(l_0 - \frac{\lambda}{dx}\right)\left(m_0 - \frac{\lambda}{dy}\right) \Bigg] /$$

$$\left\{ 1 - \left(l_0 - \frac{\lambda}{dx}\right)^2 - \left(m_0 - \frac{\lambda}{dy}\right)^2 \right\}^{\frac{3}{2}} + T \times$$

$$\left[ \left[ \left(\frac{1}{dy} - \frac{1}{dy'}\right)\left[ 1 - \left\{l_0 - \lambda\left(\frac{1}{dx} - \frac{1}{dx'}\right)\right\}^2 \right] + \right.\right.$$

-continued $$\left(\frac{1}{dx} - \frac{1}{dx'}\right)\left(l_0 - \lambda\left(\frac{1}{dx} - \frac{1}{dx'}\right)\right)$$

$$\left. \left\{m_0 - \lambda\left(\frac{1}{dy} - \frac{1}{dy'}\right)\right\} \right] \Bigg] /$$

$$\left[ 1 - \left\{l_0 - \lambda\left(\frac{1}{dx} - \frac{1}{dx'}\right)\right\}^2 - \right.$$

$$\left. \left\{m_0 - \lambda\left(\frac{1}{dy} - \frac{1}{dy'}\right)\right\}^2 \right]^{\frac{3}{2}}$$

Figure 4:
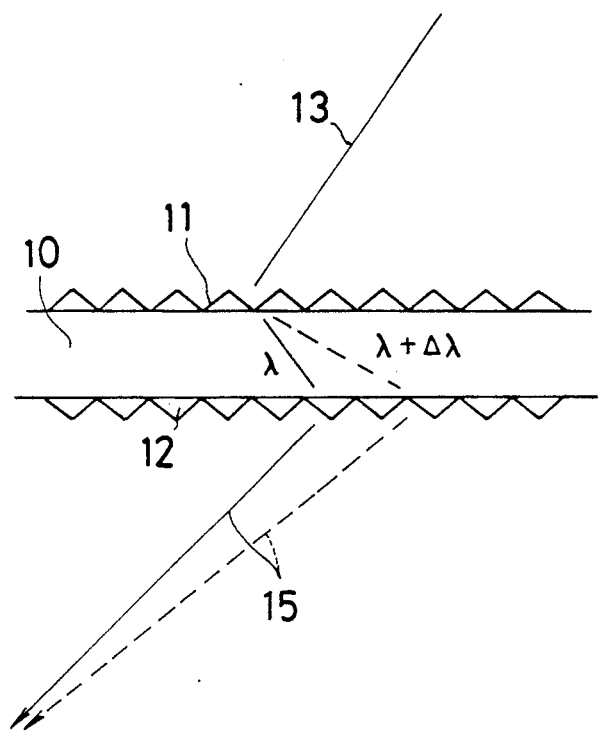
FIG. 4 is a diagrammatic partial sectional view illustrating the dual grating according to the first embodiment of the present invention.

It is to be understood from Equations (3) and (4) that $\Delta x$ and $\Delta y$ can be made small with appropriate values of dx, dx' and dy, dy', respectively. Accordingly, if it is assumed that a micro fluctuation value of 20 μm represents an allowable fluctuation which will occur in spot position, when a fluctuation in wavelength, corresponding to $\Delta \lambda$ as shown in FIG. 4, is caused by the instability of the operation of a laser, the values of dx, dx', dy and dy' can be determined so as to satisfy the following relationships:

$$20 \ \mu m \geqq \Delta x \Delta \lambda \quad (1)$$

$$20 \ \mu m \geqq \Delta y \Delta \lambda \quad (2)$$

(where $\Delta x$ and $\Delta y$ are represented by Equations (3) and (4), respectively.)

In a case where a beam of parallel light rays is incident to the dual grating 10, each value of dx, dx', dy, and dy' are the same all over the corresponding grating surface, but, in the case of incidence of a beam of non-parallel light rays, ($l_0$, $m_0$, $n_0$) differs among individual portions of the incident light. Accordingly, each value of dx, dx', dy and dy' may be selected so as to exhibit a particular distribution compensating the differences of the ($l_0$, $m_0$, $n_0$). More specifically, the grating having a large area is assumed to be an assembly of many gratings of small area, and the portions of the respective gratings may be formed so as to satisfy the aforesaid relationships (1) and (2).

In the signal detecting system of the optical pickup which employs the dual grating 10 which is arranged in the above-described manner, the photosensor elements 16 and 17 may be set at various locations. When the allowable fluctuation in spot position and the magnitude of fluctuation in wavelength are determined and the conditions of the incident light 13 are set, the position at which the photosensor element 17 is to be set with respect to the position of the photosensor element 16 can be obtained by calculations so that the aforesaid inequalities (1) and (2) are satisfied.

Figure 5:
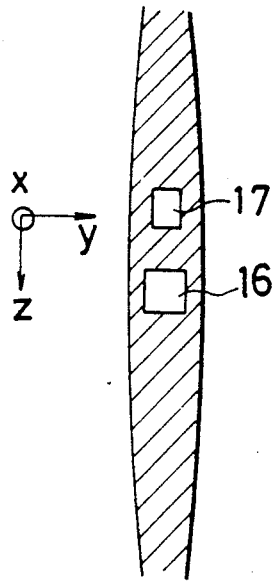
FIG. 5 is a schematic partial plan view illustrating the allowable area of the disposition of photosensor elements in the first embodiment of the present invention.
Figure 6:
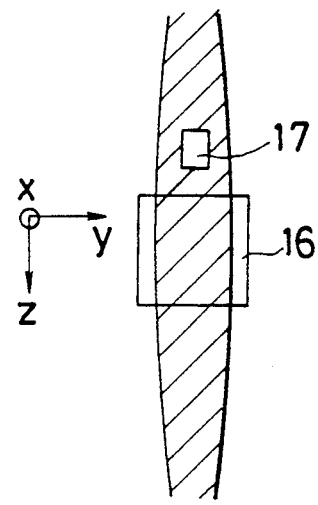
FIG. 6 is a schematic partial plan view illustrating the allowable area of the disposition of photosensor elements in the first embodiment of the present invention.

FIGS. 5 and 6 show examples of the results of the calculations. In each of FIGS. 5 and 6, a shaded portion represents the area within which the spot of diffracted light is allowed to fluctuate due to fluctuations in the wavelength. The photosensor element 17 is set within this area with respect to the photosensor element 16. If a focus-detecting function is achieved by using diffracted light in practice, it is preferable that a pitch distribution which yields astigmatism be selected. The astigmatism may be yielded by properly prescribing at least one of the lens 9, the pitch distributions of the gratings 11 and 12, and the substrate 18. In the construction shown in FIG. 1, if the lens 9 at the incident side of the dual grating 10 is omitted, the astigmatism can still be yielded by properly prescribing at least one of the pitch distributions of the gratings 11 and 12, and the substrate 18. For example, the astigmatism can be yielded by prescribing the pitch distribution of one of the gratings 11 and 12 so as to have a light focusing characteristic in one direction and prescribing the pitch distribution of the other of the gratings 11 and 12 so as to have a light focusing characteristic in two directions. For another example, the astigmatism can be yielded by only prescribing the pitch distribution of one of the gratings 11 and 12 so as to have a light focusing characteristic in two directions, wherein the focusing degrees of those two directions are slightly different from each other. In those examples mentioned above, the astigmatism can be yielded regardless of the existence of the lens 9. Of course, it is necessary that this pitch distribution satisfy inequalities (1) and (2).

In the arrangement shown in FIG. 1, even if the focusing lens 9 is eliminated, the photosensor element 17 can be set in a same manner as the above case at a position at which it does not suffer the influence of wavelength fluctuations. At this setting, although the diameter of the transmitted-light spot tends to increase, there is no special problem since the photosensor element 17 for receiving diffracted light 15 can be preferably located apart from the photosensor element 16 in the Z direction so that the diffracted light 15 and the transmitted light 14 are not overlapped or interfered with each other.

As described above, in accordance with the first embodiment described above, in order to improve stability against the fluctuations in the wavelength, the photosensor element 17 may be located adjacent to the photosensor element 16, or the photosensor element 17 may be located between photosensor elements 16, or the photosensor element 17 may be located at a position which is spaced apart from the photosensor element 16 in the Z direction.

Figure 7:
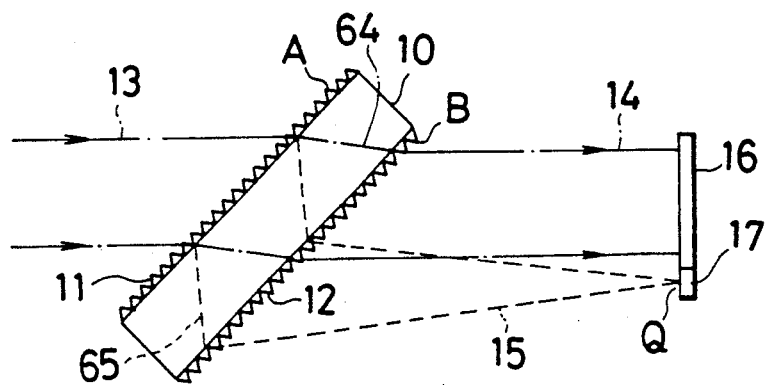
FIG. 7 is a schematic partial front view of the first embodiment of the present invention.
Figure 8A:
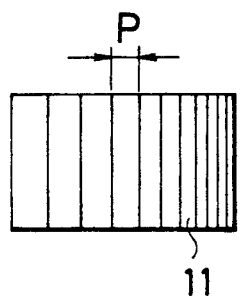
FIG. 8(a) is a schematic plan view showing the configuration of the first grating of FIG. 7.
Figure 8B:
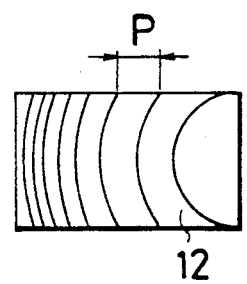
FIG. 8(b) is a schematic plan view showing the configuration of the second grating of FIG. 7.
Figure 9:
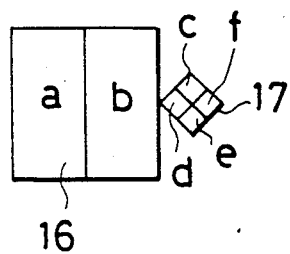
FIG. 9 is a schematic plan view showing the arrangement of the photosensor elements shown in FIG. 7.

The constructions and arrangements of the dual grating 10 and the photosensor elements 16 and 17 used in the first embodiment of the present invention are explained with reference to FIGS. 7 to 9.

This dual grating 10 is provided with the first grating 11 on a surface A which faces the ½-wavelength plate 8 and the second grating 12 on a surface B opposite to the first grating 11. The first grating 11 has linear ridgelines the pitch P of which is modulated gradually from dense to coarse from the right end to the left end as viewed in FIG. 8(a), while the second grating 12 has concentric ridgelines the pitch P of which is modulated gradually from coarse to dense from the right end to the left end as viewed in FIG. 8(b).

Light, which has passed through the dual grating 10, is split into transmitted light 14 and diffracted light 15. The photosensor element 16 having two split photo-sensing surfaces a and b is disposed on the optical path of the transmitted light 14, while the photosensor element 17 having four split photosensing surfaces c, d, e and f is disposed adjacent to the first photosensor element 16 at the position of the focus point Q of the diffracted light 15.

In such a construction, light reflected from the photo-electromagnetic disk 7, which represents the state of a particular signal, is made incident to the first grating 11 through the ½ wavelength plate 8. This incident light is separated by the first grating 11 into the first transmitted light 64 which is not diffracted but propagated uni-directionaly and the first diffracted light 65 which is not propagated uni-directionaly but is diffracted and focused in one direction only. The diffracted light 65 consisting of the light focused in one direction only passes through the second grating 12 having the concentric ridgelines. During this time, the diffracted light 65 is further diffracted into a diffracted light 15 having astigmatism by the second grating 12. In this manner, a function similar to that of a cylindrical lens can be realized, whereas very little of the transmitted light 64 is diffracted even by the second grating 12 and is propagated through it uni-directionaly to be a transmitted light 14.

As described above, the photosensor element 17 is disposed at the position of the focus point Q at which the light beam assumes a completely circular configuration on the optical path of the diffracted light 15 which is given astigmatism when it passes through the dual grating 10. Accordingly, the value of $(c+e)-(d+f)$ can be calculated by the astigmatism method to detect a focus error signal so that focus servo control is performed. On the other hand, the photosensor element 16 of the two-split type is disposed on the optical path of the transmitted light 14 which has passed through the dual grating 10. Accordingly, the value of $(a-b)$ can be calculated by the push-pull method to detect a track error signal so that tracking servo control is performed. The polarized plane of the light reflected from the photo-electromagnetic disk 7 is rotated by $\pm\theta$ ($\theta \approx 0.3°$ C.) by the magneto-optical Kerr effect, and the light 13 passes through the ½ wavelength plate 8. Accordingly, since the intensity ratio of the transmitted light 14 to the diffracted light 15 changes at the first grating 11, the value of $(a+b)-(c+d+e+f)$ can be calculated to detect a photo-electromagnetic signal so that the state of a particular signal on the photo-electromagnetic disk 7 can be read out.

Figure 10:
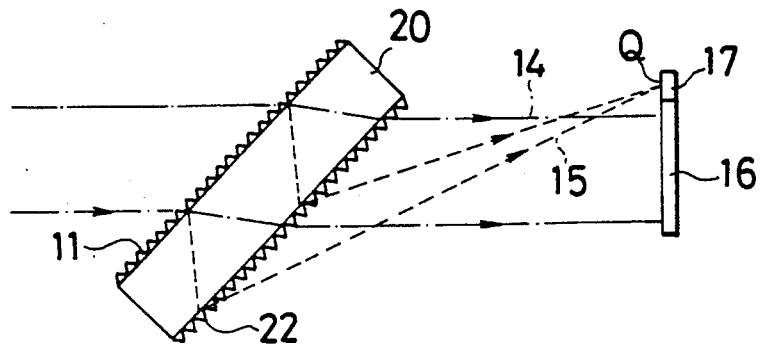
FIG. 10 is a schematic partial front view of a second embodiment of the present invention.
Figure 11A:
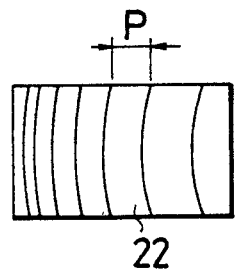
FIG. 11(a) is a schematic plan view showing the configuration of the second grating of FIG. 10.
Figure 11B:
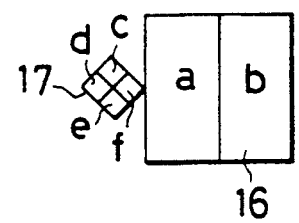
FIG. 11(b) is a schematic plan view showing the arrangement of the photosensor elements of FIG. 10.

The second embodiment of the present invention is explained below with reference to FIGS. 10, 11(a) and 11(b). In the following description, since the overall construction of the photo-electromagnetic reproducing apparatus is substantially the same as that of the first embodiment shown in FIG. 1, the explanation thereof is omitted.

In the second embodiment, the photosensor element 17 is disposed adjacent to the first photosensor element 16 at a location opposite to that illustrated in the first embodiment. In this arrangement, the optical path length of the diffracted light 15 which has passed through the dual grating 20 increases and the position of the focus point Q is shifted rearwardly, and it is therefore necessary to shift the second photosensor element 17 rearwardly by a corresponding amount. When the optical path length is to be altered to dispose the second photosensor element 17 at such a rearward position, it is necessary that ridgelines on a second grating 22 be formed into a configuration in which the concentric ridgelines are spaced apart at pitch P which becomes gradually denser from the center to the periphery of the concentric circles which is coarser than the pitch P shown in FIG. 8(b). The first grating 11 of the dual grating 20 is formed into a configuration having linear ridgelines the pitch P of which is modulated gradually as in the first embodiment described above. The method of detecting a focus error signal, a tracking error signal, and a photo-electromagnetic signal is also similar to that described in connection with the first embodiment. Accordingly, by altering the configuration (pitch of the ridgelines) of the second grating 22 as shown in the second embodiment, the degree of freedom of design can be further increased.

Figure 12:
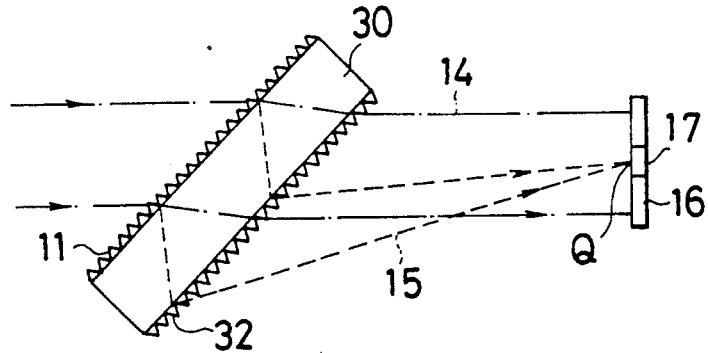
FIG. 12 is a schematic partial front view showing a third embodiment of the present invention.

A third embodiment of the present invention is explained below with reference to FIGS. 12 and 13. In the following description, since the overall construction of the photo-electromagnetic reproducing apparatus is substantially the same as that of the first embodiment shown in FIG. 1, the explanation thereof is omitted.

Figure 13A:
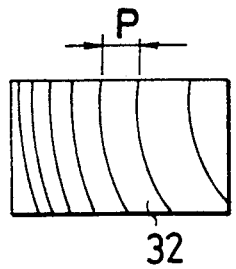
FIG. 13(a) is a schematic plan view showing the configuration of the second grating of FIG. 12.
Figure 13B:
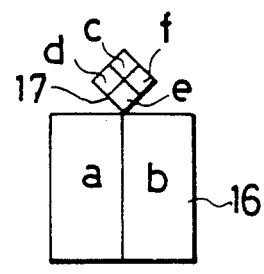
FIG. 13(b) is a schematic plan view showing the arrangement of the photosensor elements of FIG. 12.

In the third embodiment, the photosensor element 17 is disposed adjacent to the first photosensor element 16 at a location above it as viewed in FIG. 13(b). In this arrangement, accordingly, the optical path length of the diffracted light 15 changes and the position of the focus point Q is also shifted to a location above the photosensor element 16. It is necessary, therefore, that concentric ridgelines on a second grating 32 of a dual grating 30 be of a configuration in which the center of the concentric circles is displaced, as shown in FIG. 13(a), upwardly with respect to the center of the concentric pattern shown in, for example, FIG. 11(a). On the other hand, if the photosensor element 17 is to be positioned at a location below the first photosensor element 16, it is necessary that the concentric ridgelines formed on the second grating 32 be of a configuration in which the center of the concentric circles is displaced downwardly with respect to the center of the concentric pattern shown in, for example, FIG. 11(a). With either of these arrangements, it is possible to achieve advantages and effects similar to those of the second embodiment described above.

As described above, in accordance with any of the first, second, and third embodiments, it is possible to set a pitch distribution which enables light to be effectively utilized without the risk of transmitted light and diffracted light being overlapped and serving as noises to each other and which can suppress fluctuations in spot position due to wavelength fluctuations.

A fourth embodiment of the present invention is explained below with reference to FIGS. 14 and 16. In the following description, since the overall construction of the photo-electromagnetic reproducing apparatus is substantially the same as that of the first embodiment shown in FIG. 1, the explanation therefore is omitted.

In the fourth embodiment shown in FIG. 14, the focusing lens 9 is omitted. For this reason, a dual grating 40, which constitutes a light-separating means in the fourth embodiment, is provided with a second grating 42 having a grating structure which provides a lens-like function, as shown in FIG. 15(b), and which has astigmatism. A first grating 41 has, as shown in FIG. 15(a), a structure with a high-density constant pitch. The pitch of the centers of the ridgelines of the second grating 42 is made substantially equal or close to the pitch of the ridgelines of the first grating 41. In the fourth embodiment, diffracted light 15 which exits from the second grating 42 is received by the four-split type photosensor element 17 which serves as a focus-signal detecting photosensor, while transmitted light 14 is received by a set of two-split type photosensor elements 16 which serves as a track-signal detecting photosensor. As shown in FIG. 16, the four-split type photosensor element 17 is disposed between the two-split type photosensor elements 16.

In such a construction and arrangement, light reflected from the photo-electromagnetic disk 7 passes through the polarizing beam splitter 5 and is in turn incident to the dual grating 40. The first grating 41 located on the incident side separates the transmitted light 14 and the diffracted light 15 being linearly polarized light which cross each other at the polarizing angle. The second grating 42 on the outgoing side allows the light transmitted through the first grating 41 to be propagated approximately in parallel, while the light diffracted by the first grating 41 is substantially diffracted to form converged light having astigmatism. At this time, since the pitch of the centers of the ridgelines of the second grating 42 is substantially equal to the pitch of the ridgelines of the first grating 41, the transmitted light 14 and the diffracted light 15 produced by the dual grating 40 form, on the photosensor elements 16 and 17, concentric circles whose centers substantially almost coincide with each other. In other words, the separating angle $\theta$ between the transmitted light 14 and the diffracted light 15 is $\theta = 0$ or $\theta \approx 0$. Accordingly, since those gratings 41 and 42 have no substantial effect on the transmitted light 14, it can be sensed by the two-split type photosensor element 16 utilizing a push-pull method which has heretofore been used. On the other hand, since the diffracted light 15 has astigmatism, it can be sensed by the four-split type photosensor element 17 utilizing an astigmatism method. A photo-electromagnetic signal on the photo-electromagnetic disk 7 can be picked up by obtaining the difference between the total quantity of light incident on the two-split type photosensor element 16 and the total quantity of light incident on the four-split type photosensor element 17.

As described above, the configuration and the arrangement of the fourth embodiment are such that the separating angle between the diffracted light 15 and the transmitted light 14 at the dual grating 40 is 0 or close to 0. Accordingly, no offset in the separating angle is caused by fluctuations in wavelength.

Figure 19:
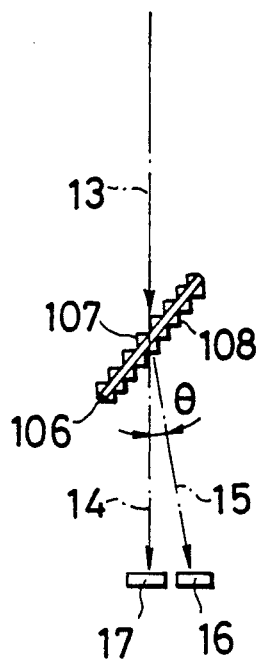
FIG. 19 is a schematic front view of a dual grating showing the angle of separation.
Figure 20:
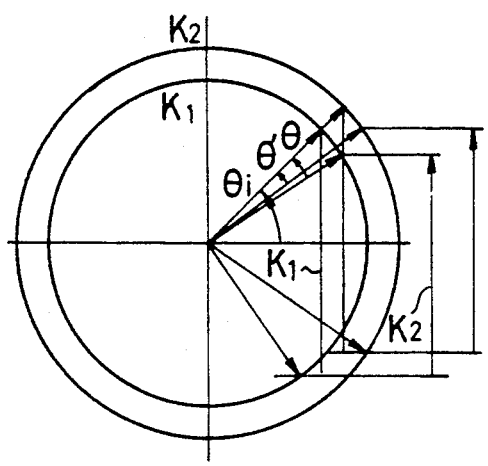
FIG. 20 is a vector diagram illustrating the angle of separation.

This point is explained in detail below with reference to FIGS. 19 and 20. Assuming the separating angle $\theta$ between the transmitted light 14 and the diffracted light 15 is arbitrarily set by setting the central pitches of a first grating 107 and a second grating 108 both of which constitute a dual grating 106, the angle $\theta$ being determined by the distances between the dual grating 106 and the photosensor elements 16 and 17 and the distance between the photosensor elements 16 and 17. In a case where the photosensor elements 16 and 17 are spaced apart from each other by a definite distance, the separating angle $\theta$ based on the dual grating 106 cannot be made zero and the photosensor elements 16 and 17 will more or less suffer the influence of wavelength fluctuations.

If $\lambda_1$ represents the wavelength of light 13 input to the dual grating 106; $\lambda_2$ represents a wavelength of the light 13 after wavelength fluctuations have occurred; $x_1$ and $x_2$ phase constants corresponding to the wavelengths $\lambda_1$ and $\lambda_2$ respectively; $\theta i$ represents the angle of input into the first grating 107; $\theta$ represents the separating angle between the diffracted light 15 and the transmitted light 14; $K_1$ represents the grating constant of the first grating 107; and $K_2$ represents the central grating constant of the second grating 108, the relationship shown by the following equation is obtained (see FIG. 20):

$$x_1 \sin \theta i - x_1 \sin (\theta i - \theta) = K_1 - K_2 \quad (15)$$

This Equation (15) is a basic equation concerning the diffraction angle of the dual grating 106. If the Equation (15) is solved in terms of the separating angle $\theta$, then $$\theta = \theta i - \sin^{-1}\left(\sin\theta i - \frac{K_1 - K_2}{x_1}\right) \quad (16)$$

In contrast, if the separating angle made when wavelength fluctuations have occurred is represented by $\theta'$, the separating angle $\theta'$ is $$\theta' = \theta i - \sin^{-1}\left(\sin\theta i - \frac{K_1 - K_2}{x_2}\right) \quad (17)$$

Thus, an offset $\Delta\theta$ in the separating angle in the presence of wavelength fluctuations is $$\begin{aligned}\Delta\theta &= \theta - \theta' \quad (18)\\ &= -\sin^{-1}\left(\sin\theta i - \frac{K_1 - K_2}{x_1}\right) + \\ &\quad \sin^{-1}\left(\sin\theta i - \frac{K_1 - K_2}{x_2}\right)\end{aligned}$$

It is understood from Equation (18) that $\Delta\theta \neq 0$ because $x_1 \neq x_2$. Accordingly, as described above, with the general dual grating system, the influence of wavelength fluctuations cannot always be ignored. In accordance with the fourth embodiment, however, $K_1 = K_2$, hence $\Delta\theta = 0$, is obtained from Equation (18) under the condition that the pitch of the centers of the ridgelines of the second grating 42 is the same as the pitch of the ridgelines of the first grating 41. Accordingly, the influence of wavelength fluctuations in a semiconductor laser or the like has no substantial effect on spot positions or it is so small that it can be ignored. As described above, the fourth embodiment excels in that it is not influenced by wavelength fluctuations. As can be seen from FIG. 14 as well, the fourth embodiment requires no focusing lens 9, hence enables a further miniaturization of the apparatus.

A fifth embodiment of the present invention is explained below with reference to FIG. 17. This embodiment is similar to the fourth embodiment except that the pitches of the ridgelines of a first grating 51 and a second grating 52 of a dual grating 50 are made different and the focusing lens 9 shown in FIG. 1 is employed. If such a focusing lens 9 is combined with the construction of the fourth embodiment, the size of the two-split type photosensor element 16 for detecting a track signal can be made small compared to the fourth embodiment, thereby being able to deal with high-speed modulated light as well. In the fifth embodiment, astigmatism for focusing purposes can be obtained through the combination of the focusing lens 9 and the dual grating 50, and the size of the four-split type photosensor element 17 is also made small compared to the fourth embodiment.

Incidentally, the first grating and the second grating used in each of the above-described embodiments may be prepared by, for example, a method which includes the steps of duplicating the first grating on either surface of a substrate by the 2P method, registering both surfaces of the substrate, and duplicating the second grating on the other surface by the 2P method.

In the foregoing embodiments, the second diffracted light 15 is used as the focusing error signal and the second transmitted light 14 is used as the tracking error signal, however, the second diffracted light 15 may be used as the tracking error signal received by the photosensor element 16 while the second transmitted light 14 may be used as the focusing error signal received by the photosensor element 17.

For the sake of comparison, a conventional type of optical recording/reproducing apparatus is explained with reference to FIG. 18 in which the same elements as those shown in FIG. 1 are denoted by the same reference numerals. In this conventional apparatus, light reflected from the photo-electromagnetic disk 7 is again reflected by the beam splitter 5, then passing through the ½ wavelength board 8, and then being introduced into an optical signal detection system 100.

In the optical signal detection system 100, the reflected light is incident on a polarizing beam splitter 102 via two lens elements 101 (one is a convex lens with the other a concave lens). This incident light is split into two light beams, one of which is uni-directionaly propagated with the other reflected. The uni-directionaly propagated light is introduced into a track photosensor element 103 having a two-split type photosensing surface, and a track error signal is detected by the track photosensor element 103 so that tracking servo control is performed. The reflected light is introduced into a focus photosensor element 105 having a four-split type photosensing surface, and a focus error signal is detected by the focus photosensor element 105 so that focus servo control is performed. In addition, a photo-electromagnetic signal for reproduction is picked up by obtaining the difference between the quantity of light received by the two-split photosensing surface of the track photosensor element 103 and the quantity of light received by the four-split photosensing surface of the focus photosensor element 105.

Figure 18:
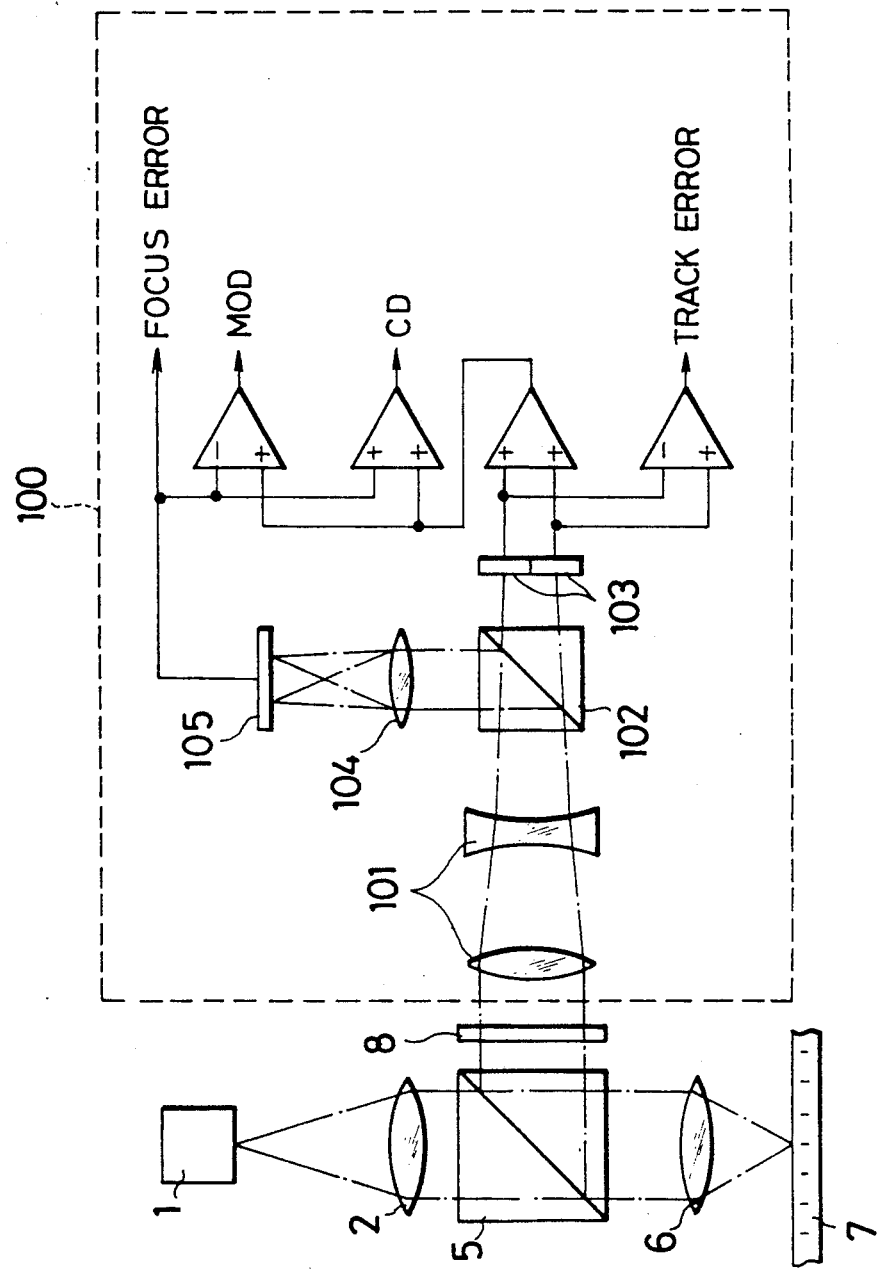
FIG. 18 is a diagrammatic front view showing an optical system of a conventional type of apparatus.

The conventional apparatus shown in FIG. 18 requires a large number of parts, particularly in the optical signal detection system 100, with the result that unduly time-consuming operation is required in order to set individual parts accurately in position during assembly processes. Moreover, since such a large number of parts are incorporated, it is very difficult to reduce the size and the weight of the entire light-pickup optical system and the conventional arrangement will therefore be much inferior in productivity.

As described above, in any of the embodiments of the present invention, there is provided an optical pickup of the type which employs a dual grating as an optical signal detection means. The optical pickup is arranged such that a photosensor element for diffracted light and a photosensor element for transmitted light are disposed approximately in the same plane, and the pitch distributions of the first and second gratings are prescribed by inequalities (1) and (2). Accordingly, the following major advantages can be achieved: first, it is possible to easily detect a photo-electromagnetic signal for reproduction, a track error signal, and a focus error signal despite a change in wavelength; second, it is possible to reduce the number of parts to be used in the optical signal detection system to a great extent so that the size and the weight of the entire light pickup optical system can be further reduced; and, third, since assembly processes can be made even simpler, it is possible to omit time-consuming operations to improve the productivity to a further extent.

What is claimed is:

1. An optical reproducing apparatus, comprising:
a dual grating provided with a substrate, a first diffraction grating on one surface of said substrate and a second diffraction grating on the other surface of said substrate, said first grating receiving an incident light reflected from an optical recording medium and separating said incident light into a first transmitted light and a first diffracted light, said second grating receiving said first transmitted light and said first diffracted light through said substrate and discharging a second transmitted light and a second diffracted light;
means for detecting a tracking error signal by receiving one of said second transmitted light and said second diffracted light; and
means for detecting a focusing error signal by receiving the other of said second transmitted light and said second diffracted light,
wherein said tracking error signal detecting means and said focusing error signal detecting means are disposed approximately in a same plane,
pitch distributions of said first grating and said second grating being prescribed by the following inequalities (1) and (2):

$$20 \ \mu m \geq \Delta x \Delta \lambda \quad (1)$$

$$20 \ \mu m \geq \Delta y \Delta \lambda \quad (2)$$

where $$\Delta x = t \times \left[ \frac{1}{dx}\left\{1 - \left(m_0 - \frac{\lambda}{dy}\right)^2\right\} + \frac{1}{dy}\left(l_0 - \frac{\lambda}{dx}\right)\left(m_0 - \frac{\lambda}{dy}\right)\right] / \left\{1 - \left(l_0 - \frac{\lambda}{dx}\right)^2 - \left(m_0 - \frac{\lambda}{dy}\right)^2\right\}^{\frac{3}{2}} + T \times \left[\left[\left(\frac{1}{dx} - \frac{1}{dx'}\right)\left[1 - \left\{m_0 - \lambda\left(\frac{1}{dy} - \frac{1}{dy'}\right)\right\}^2\right] + \left(\frac{1}{dy} - \frac{1}{dy'}\right)\left\{l_0 - \lambda\left(\frac{1}{dx} - \frac{1}{dx'}\right)\right\}\left\{m_0 - \lambda\left(\frac{1}{dy} - \frac{1}{dy'}\right)\right\}\right]\right] / \left[1 - \left\{l_0 - \lambda\left(\frac{1}{dx} - \frac{1}{dx'}\right)\right\}^2 - \left\{m_0 - \lambda\left(\frac{1}{dy} - \frac{1}{dy'}\right)\right\}^2\right]^{\frac{3}{2}} \quad (3)$$

$$\Delta y = t \times \left[\frac{1}{dy}\left\{1 - \left(l_0 - \frac{\lambda}{dx}\right)^2\right\} + \frac{1}{dx}\left(l_0 - \frac{\lambda}{dx}\right)\left(m_0 - \frac{\lambda}{dy}\right)\right] / \quad (4)$$

$$\left\{1 - \left(l_0 - \frac{\lambda}{dx}\right)^2 - \left(m_0 - \frac{\lambda}{dy}\right)^2\right\}^{\frac{3}{2}} + T \times \left[\left[\left(\frac{1}{dy} - \frac{1}{dy'}\right)\left[1 - \left\{l_0 - \lambda\left(\frac{1}{dx} - \frac{1}{dx'}\right)\right\}^2\right] + \left(\frac{1}{dx} - \frac{1}{dx'}\right)\left\{l_0 - \lambda\left(\frac{1}{dx} - \frac{1}{dx'}\right)\right\}\left\{m_0 - \lambda\left(\frac{1}{dy} - \frac{1}{dy'}\right)\right\}\right]\right] / \left[1 - \left\{l_0 - \lambda\left(\frac{1}{dx} - \frac{1}{dx'}\right)\right\}^2 - \left\{m_0 - \lambda\left(\frac{1}{dy} - \frac{1}{dy'}\right)\right\}^2\right]^{\frac{3}{2}}$$

where
dx: x-direction pitch of said first grating,
dy: y-direction pitch of said first grating,
dx': x-direction pitch of said second grating,
dy': y-direction pitch of said second grating,
t: distance between said first grating and said second grating,
$l_0$: x-direction vector of said incident light,
$m_0$: y-direction vector of said incident light,
$n_0$: z-direction vector of said incident light,
λ: wavelength of said incident light,
Δλ: amount of wavelength fluctuation,
T: z-direction distance between said second grating and said plane on which said detectors are disposed, and
20 μm: allowable wavelength fluctuation limit of a light spot on said plane on which said detectors are disposed.

2. An optical reproducing apparatus according to claim 1, wherein said pitch distributions of said first grating and said second grating are prescribed so that said focusing error signal detecting means is disposed adjacent to said tracking error signal detecting means.

3. An optical reproducing apparatus according to claim 1, wherein
said tracking error signal detecting means comprises two splitted photosensors, and
said pitch distributions of said first grating and said second grating are prescribed so that said focusing error signal detecting means is disposed between said two splitted photosensors.

4. An optical reproducing apparatus according to claim 1, wherein said pitch distributions of said first grating and said second grating are prescribed so as to form said second diffracted light into a focused light having astigmatism.

5. An optical reproducing apparatus according to claim 2, wherein said pitch distributions of said first grating and said second grating are prescribed so as to form said second diffracted light into a focused light having astigmatism.

6. An optical reproducing apparatus according to claim 3, wherein said pitch distributions of said first grating and said second grating are prescribed so as to form said second diffracted light into a focused light having astigmatism.

7. An optical reproducing apparatus according to claim 1, wherein said pitch distributions of said first grating and said second grating are prescribed so as to form said second diffracted light into a focused light and said substrate is adapted to give astigmatism to said second diffracted light.

8. An optical reproducing apparatus according to claim 2, wherein said pitch distributions of said first grating and said second grating are prescribed so as to form said second diffracted light into a focused light and said substrate is adapted to give astigmatism to said second diffracted light.

9. An optical reproducing apparatus according to claim 3, wherein said pitch distributions of said first grating and said second grating are prescribed so as to form said second diffracted light into a focused light and said substrate is adapted to give astigmatism to said second diffracted light.

10. An optical reproducing apparatus according to claim 1, further comprising a focusing lens disposed between said optical recording medium and said dual grating.

11. An optical reproducing apparatus according to claim 10, wherein said focusing lens and said substrate is adapted to form said second diffracted light into a focused light having astigmatism.

12. An optical reproducing apparatus according to claim 10, wherein said pitch distributions of said first grating and said second grating are prescribed so as to form said second diffracted light into a focused light having astigmatism in association with said focusing lens.

13. An optical reproducing apparatus according to claim 10, wherein said pitch distributions of said first grating and said second grating are prescribed so as to form said second diffracted light into a focused light having astigmatism in association with said focusing lens and said substrate.

14. An optical reproducing apparatus according to claim 4, wherein said pitch distributions of said first grating and said second grating are prescribed so that one of said first grating and said second grating has a light focusing characteristic in one direction and the other of said first grating and said second grating has a light focusing characteristic in two directions.

15. An optical reproducing apparatus according to claim 12, wherein said pitch distributions of said first grating and said second grating are prescribed so that one of said first grating and said second grating has a light focusing characteristic in one direction and the other of said first grating and said second grating has a light focusing characteristic in two directions.

16. An optical reproducing apparatus according to claim 13, wherein said pitch distributions of said first grating and said second grating are prescribed so that one of said first grating and said second grating has a light focusing characteristic in one direction and the other of said first grating and said second grating has a light focusing characteristic in two directions.

17. An optical reproducing apparatus according to claim 7, wherein said pitch distributions of said first grating and said second grating are prescribed so that one of said first grating and said second grating does not have any light focusing characteristic and the other of said first grating and said second grating has a light focusing characteristic in two directions.

18. An optical reproducing apparatus according to claim 14, wherein
one of said first grating and said second grating has a modulation pitch with straight ridgelines, and
the other of said first grating and said second grating has a modulation pitch with curved ridgelines.

19. An optical reproducing apparatus according to claim 18, wherein said curved ridgelines are concentrically formed.

20. An optical reproducing apparatus according to claim 17, wherein
one of said first grating and said second grating has a constant pitch with straight ridgelines, and
the other of said first grating and said second grating has a varied pitch with curved ridgelines.

21. An optical reproducing apparatus according to claim 20, wherein said curved ridgelines are concentrically formed.

* * * * *